Patented July 15, 1930

1,770,886

UNITED STATES PATENT OFFICE

MORRIS S. KHARASCH, OF COLLEGE PARK, MARYLAND, ASSIGNOR TO E. I. DU PONT DE NEMOURS & COMPANY, OF WILMINGTON, DELAWARE, A CORPORATION OF DELAWARE

SEED DISINFECTANT

No Drawing.  Application filed June 16, 1927. Serial No. 199,407.

This invention relates to the use of mercury salts for the treatment of seed and plant diseases, and more particularly to the use of alkyl and aryl mercury salts, either as such or mixed with a diluting ingredient of neutral, acid, or alkaline character, for this purpose.

While it has already been noticed by Gassner and Ilse Esdorn, "Arbeiten aus der Biologischen Reichsanstalt," Vol. 11, pp. 375-377 that methyl mercuric iodide is twenty times more effective than mercuric chloride against stinking smut spores, this product has not been employed in the economic control of the disease. There are two reasons which are accountable for this fact. In the first place, methyl mercuric iodide was found to be very toxic to human beings. It also causes severe skin blisters when brought into contact with the skin. Secondly, the cost of the material has been too high to be employed for such a purpose.

These serious objections have been overcome by my invention. Firstly, I have discovered that the alkyl and aryl mercury salts, other than the iodides, are much less toxic than the iodides. They do not blister the skin, may be handled safely, are more stable, and possess an enormously high effectiveness against all kinds of organisms causing plant and seed diseases. Secondly, according to my invention, a method has been developed for the preparation of these organic mercury salts, at a relatively low cost.

It is the object of my invention to make use of the high bactericidal properties of alkyl and aryl mercury salts, other than the iodides, and particularly of the alkyl mercuric chlorides, in combating the parasites which cause diseases of seeds and plants. The plants whose seeds may be advantageously disinfected by my process include wheat, oats, potatoes, beans, peas, barley, cabbage, maize, etc.

In order to disclose my invention in more detail, the following example of an actual embodiment thereof is presented. It is to be understood, of course, that this example is furnished for illustrative purposes only, and that it is not my intention to be limited to the proportions or ingredients therein set forth.

Ethyl mercuric chloride is mixed with an inert ingredient, such as talc, diatomaceous earth, or chalk or hydrated lime, or a mixture of two of the aforementioned inert ingredients in proportion anywhere from one to ten percent, a two percent mixture of the ethyl mercuric chloride and 98 percent of an inert ingredient, or 98 percent of a mixture of two of the abovementioned ingredients being the preferred embodiment. The product resulting therefrom is dusted on the seed in proportion of one to four ounces per bushel, two ounces being the preferred amount.

The process may also be carried out by steeping the seeds for a period of one hour in a suspension of the above material in a large volume of water. The ethyl mercuric chloride is slightly soluble, particularly in the presence of hydrated lime, and exerts its full disinfecting action in that manner.

This material may also be used as a spray for controlling fungus diseases of foliage, such for example as mildew of roses, bacteriosis of peaches and plums, "brown patch" of grass turf caused by rhizoctonia solani, black rot of grapes, late blight of potatoes, etc. In making up sprays containing these mercury compounds it is of advantage to add spreaders or stickers, such as soap, casein, sodium silicate, etc., wetting agents to cause the spray to readily wet the foliage, and colloidal or non-colloidal diluents such as bentonite, clay, infusorial earth, talc, hydrated lime, etc. Because of the great potency of this type of organic mercury compounds, they can be used in very great dilution.

The following examples will further illustrate my invention.

*Example 1*

25 parts of ethyl mercuric sulfate are thoroughly mixed with 300 parts of potassium soap and 685 parts of water. This mixture, when diluted in the proportion 1 oz. of the mixture to 3 gal. of water, is effective in the control of the foregoing diseases.

*Example 2*

15 parts of ethyl mercuric chloride, 70 parts of sodium silicate, 2 parts of absorbent charcoal, 10 parts of bentonite, and 903 parts of clay are mixed in a ball mill for about 2 hours. One pound of this mixture is then suspended in 50 gallons of water. This, used as a spray, will be found excellent for the control of fungus and bacterial diseases of foliage.

It will be apparent that any of the organic mercury compounds covered by my invention may be similarly used in sprays. They may also be combined with other fungicides such, for example, as Bordeaux mixture, or with insecticides such as arsenate of lead, calcium arsenate, nicotine, oil preparations, and the like.

It is understood, of course, that I do not wish to be limited to the inert materials used, as other material giving similar results may be used, nor to the exact type of alkyl mercury salts, for others than the chloride may be employed, such for example as the sulfate, acetate, cyanide, sulfide, hydroxide, etc., nor by the method of sterilization, for obvious modifications will suggest themselves to a person skilled in the art. The corresponding aryl mercury salts are also effective, for this purpose but the alkyl compounds are preferable.

It is to be understood that these alkyl or aryl mercury salts may also be used in conjunction with other seed disinfectants, such or chlorphenol mercury-chloride, or copper carbonate, or some such product, in order to reinforce their effectiveness by utilizing the high bactericidal value of the alkyl or aryl mercury salts.

When these alkyl or aryl mercury salts are made according to the method disclosed in my co-pending application, Serial No. 147,617, filed November 10, 1926, they may be purified before use or they may be used together with the lead salts formed in the reaction.

As many apparently widely different embodiments of this invention may be made without departing from the spirit thereof, it is to be understood that I do not intend to limit myself to the specific embodiments thereof except as indicated in the appended claims.

I claim:

1. A disinfectant and spray for the control of seed and plant diseases, comprising a mercury compound of the type R—Hg—X, in which R is an organic hydrocarbon radicle and X is an acid radicle other than iodine.

2. A disinfectant and spray for the control of seed and plant diseases, comprising a mercury compound of the type R—Hg—X, in which R is an alkyl group and X is an acid radicle other than iodine.

3. A disinfectant and spray for the control of seed and plant diseases, comprising a mercury compound of the type R—Hg—X, in which R is an organic hydrocarbon radicle and X is an acid radicle taken from a group including Cl, Br, OCOCH$_3$, SO$_4$, CN, S=.

4. A disinfectant and spray for the control of seed and plant diseases, comprising a mercury compound of the type R—Hg—X, in which R is an alkyl group and X is an acid radicle taken from a group including Cl, Br, OCOCH$_3$, SO$_4$, CN, S=.

5. A disinfectant and spray for the control of seed and plant diseases, comprising a mercury compound of the type R—Hg—Cl, in which R is an organic hydrocarbon radicle.

6. A disinfectant and spray for the control of seed and plant diseases, comprising a mercury compound of the type R—Hg—Cl, in which R is an alkyl group.

7. A disinfectant and spray for the control of seed and plant diseases, comprising an alkyl mercury chloride and a diluting agent.

8. A disinfectant and spray for the control of seed and plant diseases, comprising ethyl mercury chloride and a diluting agent.

9. A disinfectant and spray for the control of seed and plant diseases, comprising an alkyl mercury chloride, a second disinfectant, and a diluting agent.

10. A disinfectant and spray for the control of seed and plant diseases, comprising ethyl mercury chloride, a second disinfectant, and a diluting agent.

11. A disinfectant for the control of seed and plant diseases, comprising a mercury compound of the type R—Hg—X in which R is an organic hydrocarbon radicle and X is an acid radicle other than iodine, and water.

12. A disinfectant for the control of seed and plant diseases, comprising a mercury compound of the type R—Hg—X, in which R is an alkyl group and X is an acid radicle other than iodine, and water.

13. A disinfectant for the control of seed and plant diseases, comprising a mercury compound of the type R—Hg—X, in which R is an organic hydrocarbon radicle and X is an acid radicle taken from a group including Cl, Br, OCOCH$_3$, SO$_4$, CN, S=, and water.

14. A disinfectant for the control of seed and plant diseases, comprising a mercury compound of the type R—Hg—X, in which R is an alkyl group and X is an acid radicle taken from a group including Cl, Br, OCOCH$_3$, SO$_4$, CN, S=, and water.

15. A disinfectant for the control of seed and plant diseases, comprising a mercury compound of the type R—Hg—Cl, in which R is an organic hydrocarbon radicle, and water.

16. A disinfectant for the control of seed and plant diseases, comprising a mercury compound of the type R—Hg—Cl, in which R is an alkyl group, and water.

17. A disinfectant for the control of seed and plant diseases, comprising an alkyl mercury chloride, a diluting agent, and water.

18. A disinfectant for the control of seed and plant diseases, comprising ethyl mercury chloride, a diluting agent, and water.

19. A disinfectant for the control of seed and plant diseases, comprising an alkyl mercury chloride, a second disinfectant, a diluting agent, and water.

20. A disinfectant for the control of seed and plant diseases, comprising ethyl mercury chloride, a second disinfectant, a diluting agent, and water.

In testimony whereof I affix my signature.

MORRIS S. KHARASCH.